United States Patent
Hutkins et al.

(10) Patent No.: US 11,943,140 B2
(45) Date of Patent: Mar. 26, 2024

(54) CONTEXT-BASED PDU IDENTIFIER PROVISIONING

(71) Applicant: NIO Technology (Anhui) Co., Ltd., Hefei (CN)

(72) Inventors: Peter Hutkins, Scotts Valley, CA (US); Sophia Quan, San Jose, CA (US); Nahum Vladimir Castillo Felix, Cupertino, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 0 days.

(21) Appl. No.: 17/553,343

(22) Filed: Dec. 16, 2021

(65) Prior Publication Data

US 2023/0198900 A1 Jun. 22, 2023

(51) Int. Cl.
*H04L 45/64* (2022.01)
*H04L 45/74* (2022.01)

(52) U.S. Cl.
CPC ............ *H04L 45/64* (2013.01); *H04L 45/742* (2013.01)

(58) Field of Classification Search
CPC ... G06F 13/385; H04L 12/66; H04L 41/0893; H04L 69/18; H04L 9/04
See application file for complete search history.

(56) References Cited

U.S. PATENT DOCUMENTS

| | | | |
|---|---|---|---|
| 6,519,635 | B1 | 2/2003 | Champlin et al. |
| 9,237,196 | B2 | 1/2016 | Lee et al. |
| 10,523,387 | B2 | 12/2019 | Venugopal et al. |
| 2012/0084482 | A1* | 4/2012 | Yamanaka ............ G06F 13/385 710/305 |

(Continued)

FOREIGN PATENT DOCUMENTS

| KR | 101584213 | 1/2016 |
|---|---|---|
| WO | WO 2010/143686 | 12/2010 |
| WO | WO 2018/157030 | 8/2018 |

OTHER PUBLICATIONS

Young et al. "A parallel Re-programming Method for In-vehicle Gateway to save software update time" Proceeding of the 2015 IEEE International Conference on Information and Automation Lijiang, China, Aug. 2015 (Year: A201).*

Young et al. "A parallel Re-programming Method for In-vehicle Gateway to save software update time" Proceeding of the 2015 IEEE International Conference on Information and Automation Lijiang, China, Aug. 2015. (Year: 2015).*

(Continued)

*Primary Examiner* — Mansour Oveissi
(74) *Attorney, Agent, or Firm* — Sheridan Ross, PC

(57) ABSTRACT

An apparatus, system, and method are provided for context-based protocol data unit (PDU) identifier provisioning. A PDU service module determines, based on a first PDU identifier and using a LUT associated with servicing a PDU, a signal identifier associated with a set of signals to include in the PDU. The PDU service module generates the PDU based on the LUT associated with servicing the PDU. The PDU service module transmits the PDU and the first PDU identifier to the router module. The router module determines, based on the first PDU identifier and using a LUT associated with routing the PDU, a communication bus and an interface module associated with the communication bus. The router module determines, based on the first PDU identifier and using a LUT associated with the interface module, a second PDU identifier. The router module transmits the PDU and the second PDU identifier to the interface module.

21 Claims, 9 Drawing Sheets

(56) References Cited

U.S. PATENT DOCUMENTS

2018/0076972 A1* 3/2018 Kashiwase ........ H04L 12/40006
2021/0250788 A1 8/2021 Kim et al.

OTHER PUBLICATIONS

Extended European Search Report for European Patent Application No. 22213498.3, dated May 11, 2023 10 pages.

* cited by examiner

CONTEXT-BASED PDU IDENTIFIER PROVISIONING

FIELD

The present disclosure is generally directed to a layered communication architecture, in particular, toward using context-based PDU identifiers when communicating protocol data units (PDUs) among modules implemented at different layers in the architecture.

BACKGROUND

Some automotive electronics systems may support a layered communication architecture (e.g., a software architecture such as Automotive Open System Architecture ("AUTOSAR"), etc.) for network communication within a vehicle. For example, a layered communication architecture may support communicating PDUs among modules located in different layers of the layered communication architecture, through a communication layer. Improved techniques for communicating PDUs between modules associated with different respective layers are desired.

DETAILED DESCRIPTION

Embodiments of the present disclosure will be described in connection with a vehicle system and vehicle network communication.

Some automotive electronics systems may support a layered communication architecture (e.g., a software architecture such as AUTOSAR, etc.) for network communication within a vehicle. For example, a layered communication architecture may support routing (e.g., by a PDU router) PDUs among modules located in different layers of the layered communication architecture, using a communication layer.

Some examples of a layered communication architecture include a communication stack (also referred to herein as a COM stack, for example, as implemented in software architectures such as AUTOSAR, etc.) including communication services, communication hardware abstraction, and communication drivers. In some cases, PDUs routed among the different modules and layers of the layered communication architecture may include PDU identifiers (also referred to herein as 'PduIds'), which are labels used by a communication layer to identify interaction layer PDUs (also referred to herein as 'I-PDUs') for routing through the communication layer. PDU identifiers, for example, may be static values (e.g., fixed based on a static configuration table) that are processed by the communication layer to determine the correct destinations of the PDUs.

Some communication architectures (e.g., AUTOSAR, etc.) may use a multicast transmission from a source upper layer to a lower layer, in which the same data is addressed to multiple modules (e.g., transport modules, interface modules, etc.) in the lower layer. In such cases, for example, for a PDU router to route or transmit the data to the multiple modules, the PDU router must request the data multiple times from a PDU service module (e.g., a unified diagnostic services (UDS) server module, a PDU manager, etc.) at the source upper layer in order to route or transmit the data to the modules at the lower layers.

Figure 1:
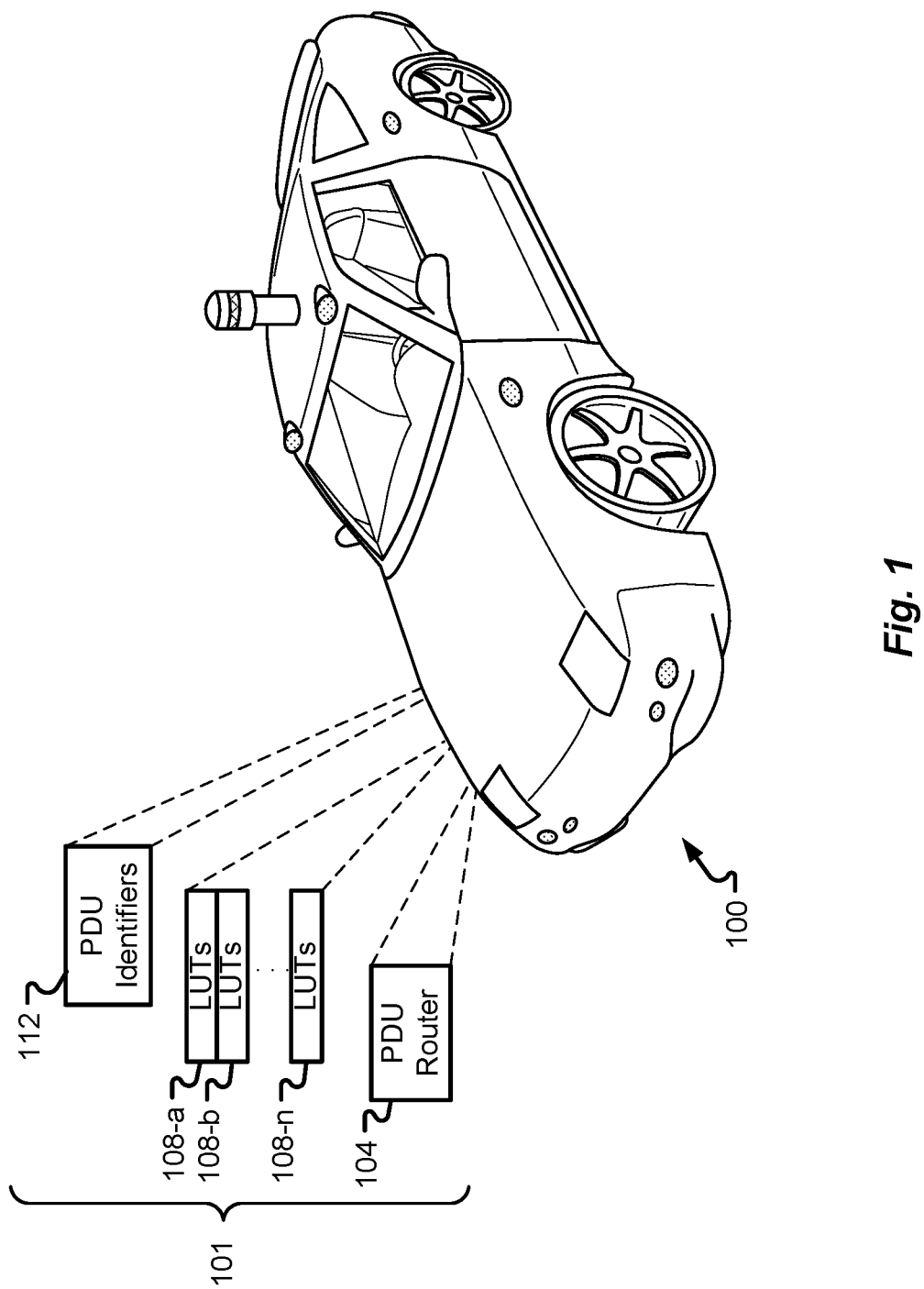
FIG. 1 illustrates an example of a system that supports context-based PDU identifier provisioning in accordance with aspects of the present disclosure.

FIG. 1 shows a perspective view of a vehicle 100 in accordance with example aspects of the present disclosure. The vehicle 100 may include one or more interior components (e.g., components inside an interior space, or user space, of a vehicle 100, etc.), exterior components (e.g., components outside of the interior space, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space of the vehicle 100 and/or on an outside of the vehicle 100. In some embodiments, the sensors and systems may be disposed in one or more portions of a vehicle 100 (e.g., a frame of the vehicle 100, a body panel, a compartment, etc.

According to example aspects of the present disclosure, a network communications system 101 (e.g., a vehicle communications system) is described herein that may support context-based (e.g., context-dependent) PDU identifier provisioning. The network communications system 101 may include a PDU router 104. The PDU router 104 may support routing of PDUs between various modules (e.g., PDU service modules, transport modules, interface modules, etc.) (also referred to herein as software components) implemented at different layers of a layered communication architecture of the network communications system 101. In some example aspects, the layered communication architecture may be an AUTOSAR layered architecture including a communication stack (e.g., ComStack) capable of facilitating network communication (e.g., vehicle network communication). In some aspects, the layered communication architecture may support communication according to various network protocols (e.g., a controller area network (CAN) communication protocol, a local interconnect network (LIN) communication protocol, Diagnostics over Internet Protocol (DoIP), etc.).

For example, layers included in the layered communication architecture may include an application layer, an application abstraction layer (e.g., supportive of a runtime environment (RTE)), and a basic software (BSW) layer. The BSW layer may include a service layer, a controller (e.g., electronic control unit (ECU)) abstraction layer, a microcontroller abstraction layer (MCAL), and device drivers. Aspects of the present disclosure described herein may be applied to any communications system (e.g., other network communications systems, other vehicle communications systems, etc.). Aspects of an example layered communication architecture and the various layers and modules implemented therein are later described with reference to FIG. 2.

According to example aspects of the present disclosure, the network communications system 101 may support generating and/or assigning a PDU identifier 112 as a handle for a PDU at every layer of the layered communication architecture (e.g., every abstraction layer). In some aspects, each PDU identifier 112 may be unique or specific to each module (e.g., PDU service modules, transport modules, interface modules, etc.) of the layered communication architecture. In some examples, different layers of the layered communication architecture may have different PDU identifiers 112 for the same PDU. For example, for a PDU communicated from a PDU service module (e.g., a UDS server module, a PDU manager, etc.) at an upper layer to a transport module at a lower layer, a PDU identifier 112 for processing a PDU at the upper layer (e.g., by the PDU service module) may be different from a PDU identifier 112 for processing the same PDU at the lower layer (e.g., by the transport module). In an example, PDU identifiers 112 used by the PDU service module (e.g., a UDS server module, a PDU manager, etc.) for referencing a set of PDUs may be different from PDU identifiers 112 used by an interface module (e.g., CAN IF) for referring the same set of PDUs.

Accordingly, for example, the network communications system 101 may support processing and communication of PDUs among the various modules (e.g., PDU service modules, transport modules, interface modules, etc.) of the layered communication architecture, without implementing a global PDU identifier for each PDU. That is, for example, the network communications system 101 may support processing and communication of a PDU by the various modules, without the modules using the same PDU identifier 112 for the PDU.

In some aspects, the network communications system 101 may support processing and communication of a PDU by the various modules, in combination with lookup tables (LUTs) 108 (e.g., LUT 108-a through LUT 108-n, where n is an integer value) associated with each module. In some cases, the LUTs 108 may be associated with each layer of the layered communication architecture. In some aspects, the LUTs 108 may be translation tables for translating between PDU identifiers 112 (e.g., local values) applicable to each module and/or layer of the layered communication architecture. Example aspects of the LUTs 108 are later described with reference to the following figures.

Each PDU identifier 112 may be context-based with respect to each module (e.g., PDU service module, transport module, interface module, etc.) of the layered communication architecture. For example, each PDU identifier 112 may be context-dependent upon each module of the layered communication architecture. In an example, as a PDU traverses through (e.g., is processed by, received by, transmitted by, etc.) different modules of the layered communication architecture, the different modules may reference the PDU using different respective PDU identifiers 112. In some example aspects, a PDU may have a 1:1 relation with a lower-level interface module (e.g., CAN IF module 254, LIN IF module 278, etc. later described with reference to FIG. 2) and/or an upper-level module (e.g., a PDU service module). Therefore, example aspects of the network communications system 101 may support directly linking respective PDU identifiers 112 to lower-level modules (e.g., lower-level interface modules) and/or upper-level modules (e.g., PDU service module).

The network communications system 101 may support single cast transmission of a PDU, example aspects of which are later described with reference to the following figures. In some cases, the network communications system 101 may support multicast transmission of a PDU. In some other cases, the network communications system 101 may support a combination of single cast transmission and multicast transmission of PDUs.

The network communications system 101 (e.g., the PDU router 104, other modules of the layered communication architecture described herein, etc.) may be implemented by aspects of a communications system 400 (later described with reference to FIG. 4), vehicle computing device 604 (later described with reference to FIG. 6), and/or a computer system 700 (later described with reference to FIG. 7). Aspects of the LUTs 108 and/or PDU identifiers 112 may be implemented at a database (e.g., database 618 later described with reference to FIG. 6) and/or a memory (e.g., storage device(s) 720 later described with reference to FIG. 7).

Figure 2A:
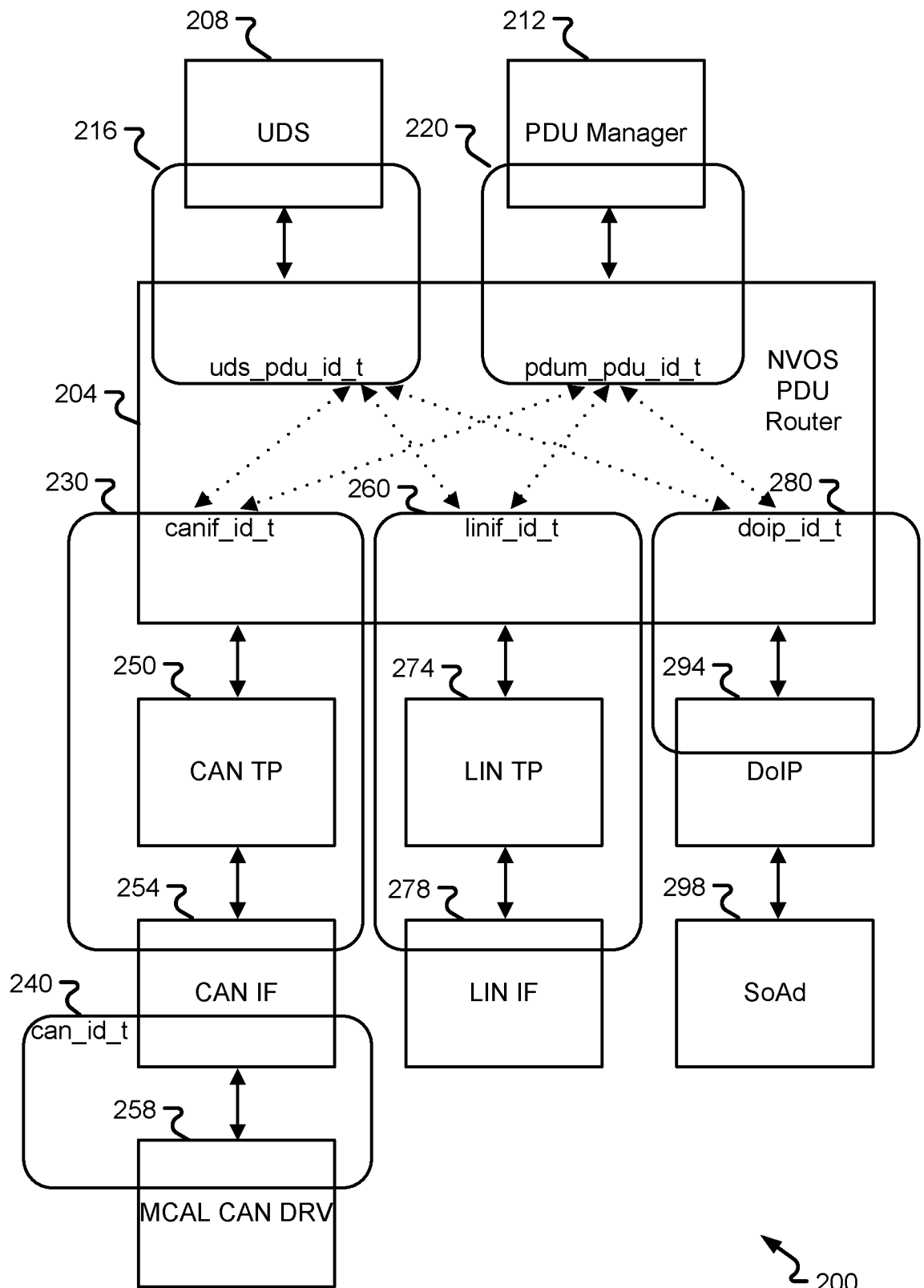
FIG. 2A illustrates an example of a system that supports context-based PDU identifier provisioning in accordance with aspects of the present disclosure.

FIG. 2A illustrates an example of a system 200 that supports context-based PDU identifier provisioning in accordance with aspects of the present disclosure. The system 200 may be an example of the network communications system 101 described with reference to FIG. 1. For example, the system 200 may include a layered communication architecture described herein. Example aspects of elements and/or features of the system 200 may include aspects of like elements described with reference to FIG. 1.

In an example, the system 200 may include a PDU router 204 and one or more PDU service modules (e.g., UDS 208, PDU manager 212, etc.). The PDU router 204 and the PDU service modules may be included in the service layer of the layered communication architecture. In some aspects, the system 200 may be referred to as a vehicle operating system (VOS), and the PDU router 204 may be referred to as a VOS PDU router.

The system 200 may support communication using a various communication protocols. For example, the system 200 may support a CAN communication protocol, a LIN communication protocol, and/or DoIP, but is not limited thereto. With reference to FIG. 2A, the system 200 may include a CAN TP module 250, a CAN IF module 254, a MCAL CAN driver (DRV) 258 (also referred to herein as CAN DRV 258), a LIN TP module 274, a LIN IF module 278, a DoIP module 294, and a socket adapter (SoAd) module 298. In some aspects, the system 200 may include other transport modules, interface modules, drivers (e.g., communication drivers, bus drivers, etc.) other than those in the examples illustrated herein.

The CAN TP module 250 provides services for segmentation, transmission with flow control, and reassembly of messages. In some aspects, the CAN TP module 250 may support transmitting and receiving messages that may or may not fit into a single CAN frame. The CAN TP module 250 may be included in the service layer of the layered communication architecture.

The CAN IF module 254 assists in the hardware abstraction of the system 200. In some cases, the CAN IF module 254 is responsible for services like transmit request, controller mode control etc. In some aspects, the CAN IF module 254 carries out all hardware independent tasks related to the flow of data to upper layer modules of a CAN stack. The CAN IF module 254 may be included in the controller (ECU) abstraction layer of the layered communication architecture.

The MCAL CAN DRV 258 is part of the MCAL layer of the layered communication architecture. The MCAL CAN DRV 258 provides hardware access to upper layer services and a hardware-independent interface to the upper layers. The MCAL CAN DRV 258 may be included in microcontroller abstraction layer of the layered communication architecture.

The LIN TP module 274 may support the transport of diagnostic service requests and responses. The LIN TP module 274 may support services for segmentation, transmission with flow control, and reassembly of messages. The LIN TP module 274 may be included in the service layer of the layered communication architecture.

The LIN IF module 278 connects to the PDU Router 204 and/or alternative modules above the LIN IF module 278 for transmission and reception of frames. In some aspects, the LIN IF module 278 is responsible for the copying of the data of the frames for reception and transmission. The LIN IF module 278 may be included in the controller (ECU) abstraction layer of the layered communication architecture.

DoIP facilitates the use of automotive diagnostic services exposed through UDS over TCP/IP on an Ethernet network. The DoIP module 294 may be an operating system independent software module which may support transmission of communications amongst components (e.g., devices, applications, etc.) internal and/or external to the system 200, using IP. For example, the system 200 may support communications using DoIP, including an Ethernet IF (ETH IF) module (not illustrated), a TCP/IP module (e.g., a socket based TCP/IP stack) (not illustrated), the SoAd module 298, and the DoIP module 294. The SoAd module 298 creates an interface between the PDU router 204 and the TCP-IP module (e.g., a socket based TCP/IP stack). The SoAd module 240 may map I-PDU identifiers to socket connections and vice versa. In some cases, the SoAd module 240 may receive UDP messages or TCP streams and convert the same into PDUs compatible with the system 200 (e.g., compatible with the PDU router 204, other modules of the system 200, etc.).

Figure 2B:
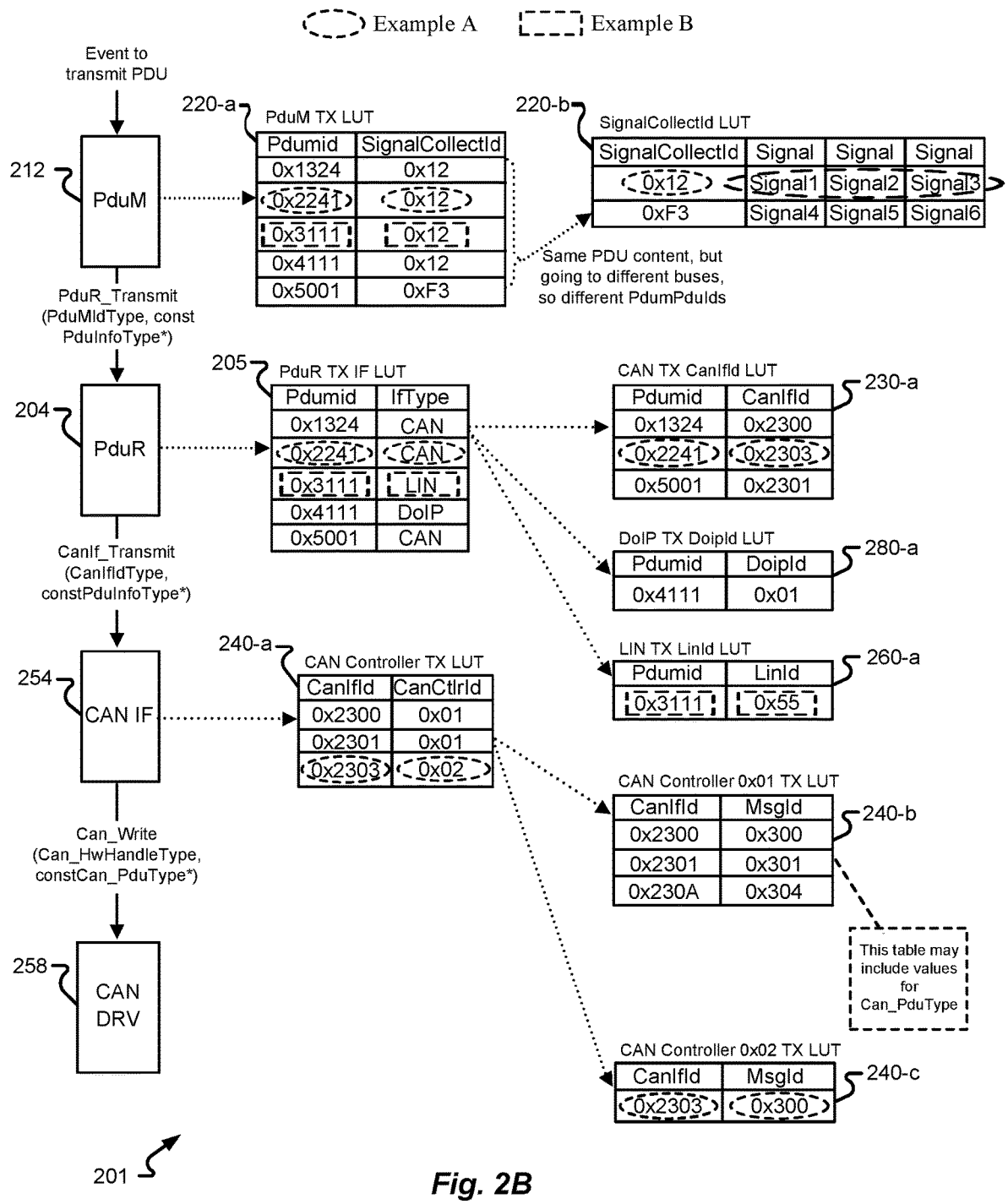
FIGS. 2B and 2C illustrate examples that support context-based PDU identifier provisioning in accordance with aspects of the present disclosure.
Figure 2C:
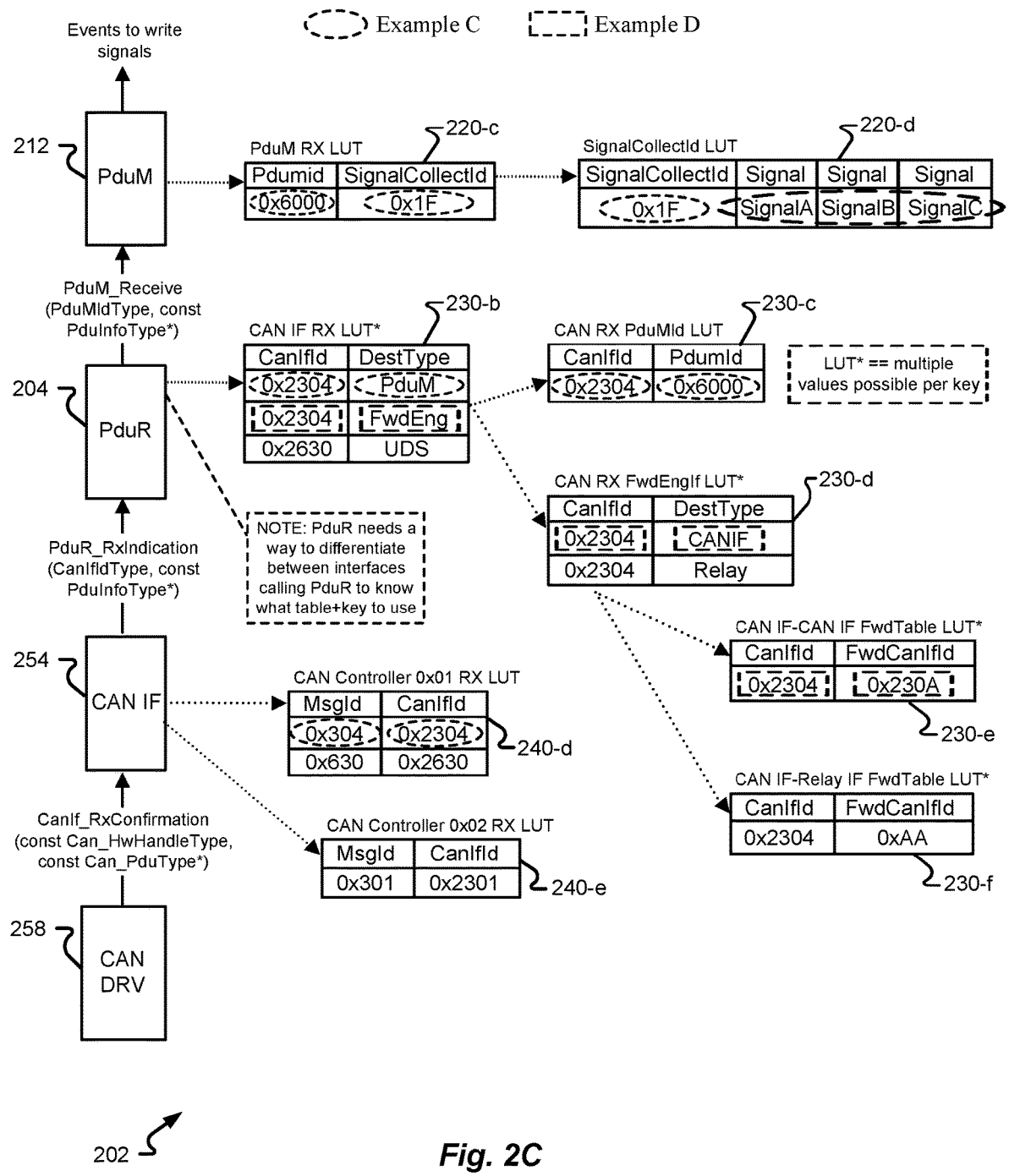

Example aspects of the present disclosure are described with reference to FIG. 2A through FIG. 2C. For example, FIG. 2B illustrates an example 201 supported by the system 200 of generating, routing, and transmitting a PDU (e.g., a message including the PDU). FIG. 2C illustrates an example 202 supported by the system 200 of receiving a PDU (e.g., a message including the PDU).

The system 200 may support generating and/or assigning a PDU identifier (e.g., 'PdumId', 'SignalCollectId', 'CanIfId', 'CanCtlrId', 'FwrdCanIfId', 'DoipId', 'LinId', etc. illustrated at FIG. 2B and FIG. 2C) as a handle for a PDU at every layer of the layered communication architecture (e.g., every abstraction layer). In some aspects, each PDU identifier may be unique or specific to each module (e.g., PDU service modules, transport modules, interface modules, etc.) of the layered communication architecture. For example, each PDU identifier may be unique or specific to each of the UDS server module 208, the PDU manager 212, the PDU router 204, the CAN TP module 250, the CAN IF module 254, etc.

In some examples, different layers of the layered communication architecture may have different PDU identifiers for the same PDU. For example, for a PDU communicated from a PDU service module (e.g., UDS server module 208, PDU manager 212, etc.) at an upper layer to a transport module (e.g., CAN TP module 250, LIN TP module 274, etc.) at a lower layer, a PDU identifier for processing the PDU at the upper layer (e.g., by the PDU service module) may be different from a PDU identifier for processing the same PDU at the lower layer (e.g., by the transport module).

In an example, PDU identifiers used by a PDU service module (e.g., UDS server module 208, PDU manager 212, etc.) for referencing a set of PDUs may be different from PDU identifiers used by a transport module (e.g., CAN TP module 250, LIN TP module 274, etc.) for referring the same set of PDUs. Additionally, or alternatively, PDU identifiers used by the PDU service module and/or the transport module may be different from PDU identifiers used by an interface module (e.g., CAN IF module 254, LIN IF module 278, etc.) for referring to the same set of PDUs.

Accordingly, for example, the system 200 may support processing and communication of PDUs among the various modules (e.g., PDU service modules, transport modules, interface modules, etc.) of the layered communication architecture, without implementing a global PDU identifier for each PDU. That is, for example, the system 200 may support processing and communication of a PDU by the various modules, without using the same PDU identifier for the PDU.

In some aspects, the system 200 may support processing and communication of a PDU by the various modules, in combination with LUTs associated with each module. In some cases, the LUTs may be associated with each layer of the layered communication architecture. In some aspects, the LUTs may be translation tables for translating between PDU identifiers (e.g., local values) applicable to each module and/or layer of the layered communication architecture.

For example, the system 200 may include a LUT 205 associated with the PDU router 204, a LUT(s) 216 associated with the UDS server module 208, and a LUT(s) 220 associated with the PDU manager 212. In some aspects, the system 200 may include a LUT(s) 230 associated with CAN transport and interface modules (e.g., CAN TP module 250, CAN IF module 254, etc.), a LUT(s) 240 associated with MCAL CAN DRV 258. In some examples, the system 200 may include a LUT(s) 260 associated with LIN transport and interface modules (e.g., LIN TP module 274, LIN IF module 278, etc.). In some other examples, the system 200 may include a LUT(s) 280 associated with the DoIP module 294.

Each PDU identifier may be context-based with respect to each module (e.g., PDU service module, transport module, interface module, etc.) of the layered communication architecture. For example, each PDU identifier 112 be context-dependent upon each module of the layered communication architecture. In an example, as a PDU traverses through (e.g., is processed by, received by, transmitted by, etc.) different modules of the layered communication architecture, the different modules may reference the PDU using different respective PDU identifiers. In some aspects, a PDU may have a 1:1 relation with a lower-level interface module (e.g., CAN TP module 250, CAN IF module 254, LIN TP module 274, LIN IF module 278, DoIP module 294, etc.) and/or an upper-level module (e.g., a PDU service module such as UDS server module 208 or PDU manager 212). Therefore, example aspects of the system 200 may support directly linking respective PDU identifiers to lower-level modules (e.g., lower-level interface modules) and/or upper-level modules (e.g., PDU service modules).

Each module (e.g., PDU service module, transport module, interface module, etc.) of the system 200 may use a PDU identifier corresponding to the module as a handle for looking up or obtaining secondary information for processing or working on the PDU at the layer of abstraction at which the module is implemented.

In an example, with reference to FIG. 2B and 'Example A', the PDU manager 212 may use PDU identifier 'PdumId' (e.g., 0x2241), PDU identifier 'SignalCollectId' (e.g., 0x12), and a LUT 220-a to determine how to multiplex and demultiplex signals into a PDU. In some aspects, the PDU manager 212 may use PDU identifier 'SignalCollectId' (e.g., 0x12) and LUT 220-b to determine how to multiplex and demultiplex the signals into a PDU.

The PDU router 204 may use the PDU identifier 'PdumId' (e.g., 0x2241) to determine a transmission interface (e.g., CAN IF module 254, LIN IF module 278, DoIP module 294, etc.) to which to send a PDU. For example, based on a PDU identifier 'PdumId' having a value of '0x2241' and the LUT 205, the PDU router 204 may identify that the PDU identifier 'PdumId' (e.g., 0x2241) corresponds to a CAN interface type (e.g., 'IfType' equal to 'CAN'). In another example, using the PDU identifier 'PdumId', the PDU router 204 may determine which buffer to route an incoming PDU to. Additionally, or alternatively, with reference to 'Example B' of FIG. 2B, based on a PDU identifier 'PdumId' having a value of '0x3111' and the LUT 205, the PDU router 204 may identify that the PDU identifier 'PdumId' (e.g., 0x3111) corresponds to a LIN interface type (e.g., 'IfType' equal to 'LIN).

The CAN IF module 254 may use PDU identifier 'CanIfId' (e.g., 0x2303) and LUT 240-a to determine a controller identifier 'CanCtrlId' (e.g., 0x02) for transmitting the PDU. In some aspects, the CAN IF module 254 may use the PDU identifier 'CanIfId' (e.g., 0x2303) and LUT 240-b to determine a message identifier 'MsgId' (e.g., 0x300) for transmitting the PDU. Accordingly, for example, the PDU identifier 'CanIfId' (e.g., 0x2303) can be used to look up the MsgId and CAN bus of for transmitting the PDU.

According to example aspects of the present disclosure, the PDU identifier of a PDU may change between layers. For example, the PDU identifier of the PDU may change according to the domain of a module (e.g., PDU manager 212, PDU router 204, CAN TP module 250, CAN IF module 254, etc.) processing the PDU at a given layer, as illustrated in the examples of FIGS. 2B and 2C. Accordingly, for example, when routing a PDU between different layers (e.g., different domains), the PDU router 204 may support features for (e.g., gains responsibility of) translating the PDU identifier corresponding to the PDU between the layers. In some aspects, for communication between layers, the PDU router 204 may reference a LUT (e.g., a translation table) associated with the layers.

For example, the PDU router 204 may reference a LUT that includes PDU identifiers for the local values implemented at both layers. In an example, when routing a PDU from the PDU manager 212 (e.g., located at an upper layer) to the CAN IF module 254 (e.g., located at a controller (ECU) abstraction layer), the PDU router 204 may reference LUT 230-a ('CAN TX CanIfId LUT') to translate the PDU identifier 'PdumId' ('0x2241') to a PDU identifier 'CanIfId' (0x2303). Additionally, or alternatively, with reference to 'Example B' of FIG. 2B, when routing a PDU from the PDU manager 212 (e.g., located at an upper layer) to the LIN IF module 278 (e.g., located at a controller (ECU) abstraction layer), the PDU router 204 may reference LUT 260-a ('LIN TX LinId LUT') to translate a PDU identifier 'PdumId' ('0x3111') to a PDU identifier 'LinId' (0x55).

From an architectural perspective, aspects of the present disclosure support features in which all static PDU information (e.g., PDU data) is accessible by each module (e.g., PDU router 204, UDS server module 208, PDU manager 212, CAN IF module 254, etc.) based on a PDU identifier for the module. In some aspects, the PDU identifier may be specific to the layer in which the module is located. In an example, when receiving a PDU, a module (e.g., layer in which the module is located) receives a PDU identifier as a handle. The module may look up whatever it needs, using the PDU identifier and a LUT specific to the module. In some aspects, the module may extract data from the PDU using an internal application programming interface (API).

For example, with reference to 'Example A' of FIG. 2B, the CAN IF module 254 may be provided with a PDU and a PDU identifier 'CanIfId' (0x2303) to transmit. Using the PDU identifier 'CanIfId' (0x2303) and LUT 240-a ('CAN Controller TX LUT'), the CAN IF module 254 may determine that the PDU identifier 'CanIfId' (0x2303) is mapped to a PDU identifier 'CanCtrlId' (0x02). Accordingly, for example, the CAN IF module 254 may determine that the CAN IF module 254 is to provide the PDU to a 'CAN Controller 02'. The CAN IF module 254 may provide the PDU and the PDU identifier 'CanIfId' (0x2303) to 'CAN Controller 02'.

Using the PDU identifier 'CanIfId' (0x2303) and LUT 240-c ('CAN Controller 0x02 TX LUT'), the 'CAN Controller 02' may determine that the PDU identifier 'CanIfId' (0x2303) is mapped to a PDU identifier 'MsgId' (0x0300) (also referred to herein as a message identifier). Accordingly, for example, the 'CAN Controller 02' may determine that the 'CAN Controller 02' is to generate a message including the PDU identifier 'MsgId' (0x0300). The message may include a set of signals (e.g., Signal1, Signal2, Signal3, etc.) that have been multiplexed into the PDU by the PDU manager 212.

According to example aspects of the present disclosure, when receiving a PDU, a module (e.g., PDU router 204, UDS server module 208, PDU manager 212, CAN IF module 254, etc.) may access PDU information (e.g., PDU data) specific to the module using a PDU identifier and a LUT that are specific to the module. The module (or layer in which the module is implemented) may access the PDU information, without knowing details associated with storage at the LUT. For example, the module may access the PDU information, without knowing details associated with the efficiency of the table look-up, associated hashing algorithms, etc.

In some aspects, the system 200 may support a system-wide PDU generation database (also referred to herein as a global PDU database). In an example, the system-wide PDU generation database may store information (e.g., data) from CAN database files (DBCs), LIN Description Files (LDFs), and input configuration files. In some aspects, the system-wide PDU generation database may include PDU identifiers referring to the same PDU for each abstraction level of the system 200 (e.g., each layer of the layered communication architecture described herein).

The system-wide PDU generation database may be accessible to any generator (e.g., device and/or application associated with the system 200) capable of generating tables (e.g., LUTs, translation tables, etc.) based on PDU identifiers. That is, for example, the system-wide PDU generation database may serve as a common reference point for generating the tables (e.g., LUTs, translation tables, etc.) described herein, based on which modules (e.g., PDU router 204, UDS server module 208, PDU manager 212, CAN IF module 254, etc.) of the system 200 can translate PDU identifiers from one level (e.g., layer) to another.

Aspects of the present disclosure may support LUTs having improved efficiency with respect to data storage and data access compared to other LUT implementations in which a LUT includes a single global PDU identifier generated for each PDU. For example, aspects of the present disclosure support PDU identifiers selected at each level of the system 200 (e.g., each level of the layered communication architecture) such that look-ups at each level and/or at each LUT have improved lookup efficiency (e.g., reduced lookup durations) compared to other LUT implementations. In some aspects, the LUTs of the present disclosure may have improved lookup efficiency in any programming language (e.g., C, C++, etc.) compared to other LUT implementations.

According to example aspects of the present disclosure, when assigning PDU identifiers at each level of a layered communication architecture, assignment strategies that translate well into each other may be implemented. In some aspects, the PDU identifiers may be any random number. In some other aspects, the PDU identifiers may be generated and/or assigned such that the PDU identifiers follow a pattern (e.g., a naming pattern, a numbering pattern, etc.). In some other aspects, the PDU identifiers may be generated and/or assigned according to a sequential order.

Aspects of the generating the PDU identifiers and LUTs described herein may include at least partially deriving and/or assigning PDU identifiers such that the LUTs described herein (e.g., LUT 205, LUT(s) 216, LUT(s) 220, LUT(s) 230, LUT(s) 240, LUT(s) 260, LUT(s) 280, etc.) have a higher density and smaller size compared to other LUT implementations for PDU identifiers. For example, some other LUT implementations may include a single, sparsely populated, and exhaustive LUT (e.g., including a single global PDU identifier generated for each PDU), which may result in reduced lookup efficiency compared to the LUTs described with reference to the present disclosure.

In some aspects, the PDU identifiers described herein may be static at the time of generation by the system 200, and the LUTs described herein (e.g., LUT 205, LUT(s) 216, LUT(s) 220, LUT(s) 230, LUT(s) 240, LUT(s) 260, LUT(s) 280, etc. described with reference to FIGS. 2A through 2C) that include the PDU identifiers may be unmodifiable. For example, aspects of the present disclosure may support LUTs in which PDU identifiers may not be added or removed.

Accordingly, for example, aspects of the present disclosure support LUTs (e.g., any or all of LUT 205, LUT(s) 216, LUT(s) 220, LUT(s) 230, LUT(s) 240, LUT(s) 260, LUT(s) 280, etc. described with reference to FIGS. 2A through 2C) that are perfect non-colliding O(1) lookup tables (e.g., expected worst case is O(1)). For example, any or all of the LUTs of the system 200 may be a complete and full hash that is free from gaps (e.g., data value gaps in the LUTs) and/or free from collision. For example, with respect to collisions, any or all of the LUTs of the system 200 may be free from instances in which two or more elements of the LUT are hashed or mapped to the same value (e.g., inserted at the exact same place in an array). That is, for example, data structures of the LUTs described herein may support perfect, non-colliding O(1) lookup tables that are free from gaps and/or collision.

Example aspects of the LUTs described herein may protect against illegal PDU identifiers (e.g., instances of non-covered PDU identifiers) as well as colliding legal PDU identifiers (e.g., instances of a covered PDU identifier that collides with another covered PDU identifier). In some aspects, the system 200 may support reporting of illegal lookups.

Aspects of the system-wide PDU generation database may be implemented, for example, by aspects of a database (e.g., database 618 later described with reference to FIG. 6) and/or a memory (e.g., storage device(s) 720 later described with reference to FIG. 7). Aspects of the generator may be implemented by aspects of a communications system 400 (e.g., a computing device 468 later described with reference to FIG. 4), vehicle computing device 604 (later described with reference to FIG. 6), and/or a computer system 700 (e.g., a CPU(s) 708 later described with reference to FIG. 7).

Figure 3A:
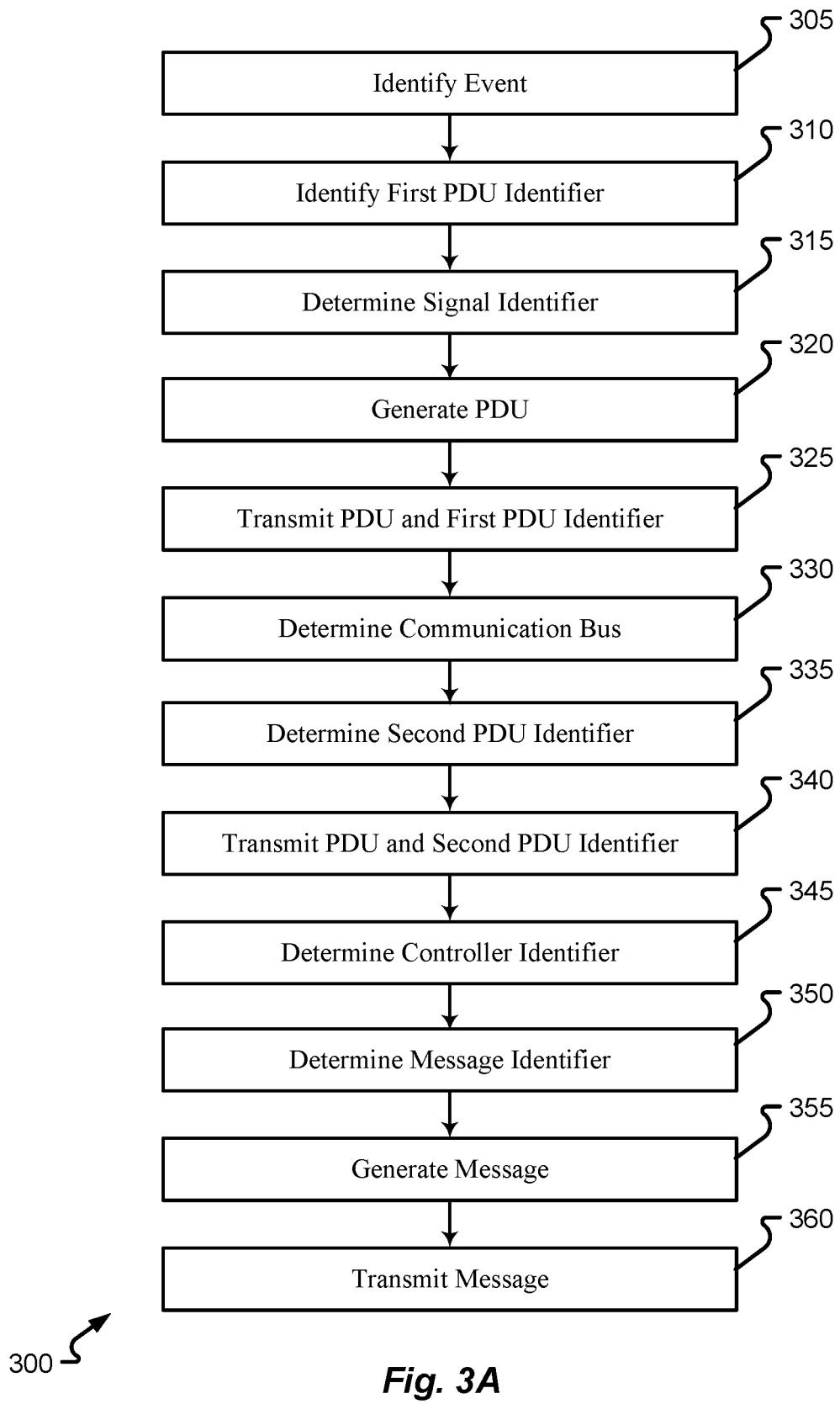
FIGS. 3A and 3B illustrate example process flows that support context-based PDU identifier provisioning in accordance with aspects of the present disclosure.

FIG. 3A illustrates an example of a process flow 300 that supports context-based PDU identifier provisioning in accordance with aspects of the present disclosure. In some examples, process flow 300 may implement aspects of the vehicle 100, the network communications system 101, and the system 200 described with reference to FIG. 1 and FIGS. 2A through 2C.

In the following description of the process flow 300, the operations may be performed in a different order than the order shown, or the operations may be performed in different orders or at different times. Certain operations may also be left out of the process flow 300, or other operations may be added to the process flow 300.

It is to be understood that while various modules (e.g., PDU router 204, a PDU manager 212, CAN TP module 250, CAN IF module 254, etc.) of a layered communication architecture of the system 200 are described as performing a number of the operations of process flow 300, any device (e.g., a vehicle 100, a vehicle computing device 604, a computer system 700) or module (e.g., any PDU router, PDU service module, transport module, interface module, etc.) may perform the operations shown. The process flow 300 is described with reference to 'Example A' and 'Example B' of FIG. 2B, but is not limited thereto.

At 305, a PDU service module (e.g., PDU manager 212, UDS server module 208) included in a first layer (e.g., a communication layer, a service layer) of the layered communication architecture may identify an event associated with transmitting a PDU.

At 310, the PDU service module may identify a first PDU identifier (e.g., 'PdumId' (0x2241)). In some aspects, the first PDU identifier is associated with the event.

At 315, the PDU service module may determine, based on the first PDU identifier and using a LUT (e.g., LUT 220-*a*

('PDUM TX LUT')) associated with servicing (e.g., managing) the PDU, a signal identifier (e.g., 'SignalCollectID' (0x12)) associated with a set of signals (e.g., Signal1 through Signal3) to include in the PDU.

At 320, the PDU service module may generate, based on the LUT associated with servicing (e.g., managing) the PDU, the PDU including the set of signals. In some aspects, generating the PDU may be based on the first PDU identifier and a second LUT (e.g., LUT 220-*b* ('SignalCollectId LUT')) associated with generating the PDU. In some aspects, the second LUT includes the set of signals.

At 325, the PDU service module may transmit the PDU and the first PDU identifier to a router module (e.g., PDU router 204). The router module may be included in the first layer of the layered communication architecture. In some aspects, transmitting the PDU and the first PDU identifier to the router module PDUR may be associated with a first temporal instance.

At 330, the router module may determine, based on the first PDU identifier and using a LUT (e.g., LUT 205 ('PDUR TX IF LUT')) associated with routing the PDU, a communication bus (e.g., a CAN bus, in 'Example A') and an interface module (e.g., CAN IF module 254, in 'Example A') associated with the communication bus.

At 335, the router module may determine, based on the first PDU identifier and using a LUT (e.g., LUT 230-*a* ('CAN TX CanIfID LUT')) associated with the interface module, a second PDU identifier (e.g., 'CanIfId' (0x2303) in 'Example A') associated with the interface module CAN IF.

At 340, the router module may transmit the PDU and the second PDU identifier to the interface module. In some aspects, transmitting the PDU and the second PDU identifier to the interface module may be associated with a second temporal instance.

In some aspects, transmitting the PDU and the second PDU identifier to the interface module may include transmitting the PDU and the second PDU identifier to a transport module (e.g., CAN TP module 250 in 'Example A', LIN TP module 274 in 'Example B') associated with the communication bus. In some aspects, the transport module forwards the PDU and the second PDU identifier to the interface module based on the second PDU identifier.

At 345, the interface module may determine, based on the second PDU identifier and using a LUT (e.g., LUT 240-*a* ('CAN Controller TX LUT') in 'Example A') associated with the interface module, a controller identifier (e.g., 'CanCtlrId' (0x02) in 'Example A') indicating a controller module (e.g., CAN controller 0x02 in 'Example A') associated with the communication bus;

At 350, the interface module may determine, based the second PDU identifier and using a LUT (e.g., LUT 240-*c* ('CAN Controller 0x02 TX LUT')) associated with the controller module, a message identifier (e.g., 'MsgId' (0x300) in 'Example A').

At 355, the controller module may generate a message including the message identifier and the set of signals.

At 360, a device driver (e.g., MCAL CAN DRV 258 in 'Example A') associated with the communication bus may transmit the message across the communication bus.

Additionally, or alternatively, in some examples not illustrated, the router module may determine, based on a third PDU identifier (e.g., 'PdumId' (0x3111) in 'Example B') and using the LUT associated with routing the PDU, a second communication bus (e.g., a LIN bus, in 'Example B') and a second interface module (e.g., LIN IF module 278, in Example 'B') associated with the second communication bus. The router module may determine, based on the third PDU identifier and using a LUT (e.g., LUT 260-*a* ('LIN TX LINID LUT')) associated with the second interface module, a fourth PDU identifier (e.g., 'LinId' (0x55) in 'Example B') associated with the second interface module. The router module may transmit the PDU and the fourth PDU identifier to the second interface module.

In some aspects, transmitting the PDU and the second PDU identifier to the interface module and transmitting the PDU and the fourth PDU identifier to the second interface module are based on a same data request by the router module.

In some aspects, the system 200 may include a database including a set of LUTs (e.g., LUT 205, LUT(s) 216, LUT(s) 220, LUT(s) 230, LUT(s) 240, LUT(s) 260, LUT(s) 280, etc.).

In some aspects, each LUT of the set of LUTs is associated with a respective layer of a set of layers of the layered communication architecture, a respective module of a set of modules of the layered communication architecture, or both. In some aspects, the set of layers may include at least the first layer, and the set of modules may include at least the router module and the interface module. In some aspects, at least one LUT of the set of LUTs may include a non-colliding O(1) lookup table.

In an example, the set of LUTs may include at least one of: the LUT (e.g., LUT 220-*a* ('PDUM TX LUT')) associated with servicing the PDU; the LUT (e.g., LUT 205 ('PDUR TX IF LUT') associated with routing the PDU; the LUT (e.g., LUT 240*a* ('CAN Controller TX LUT'), in 'Example A') associated with the interface module; and the LUT (e.g., LUT 240-*c* ('CAN Controller 0x02 TX LUT'), in 'Example A') associated with the controller module (e.g., CAN controller 0x02, in 'Example A') associated with the communication bus.

In some aspects, the database may include multiple sets of PDU identifiers. In an example, each set of PDU identifiers is associated with a respective LUT of the set of LUTs, a respective layer of the layered communication architecture, a respective module of the layered communication architecture, or a combination thereof.

In some aspects, the multiple sets of PDU identifiers may include at least one of: a first set of PDU identifiers associated with multiplexing signals into an outgoing PDU, demultiplexing signals of an incoming PDU, or both; a second set of PDU identifiers associated with routing the outgoing PDU, the incoming PDU, or both; a third set of PDU identifiers associated with determining a transmission interface to which to transmit the outgoing PDU, determining a buffer to which to route the incoming PDU, or both; and a fourth set of PDU identifiers associated with determining a message identifier corresponding to the outgoing PDU, the incoming PDU, or both. In some aspects, the fourth set of PDU identifiers is associated with determining a communication bus corresponding to the outgoing PDU, the incoming PDU, or both.

Figure 3B:
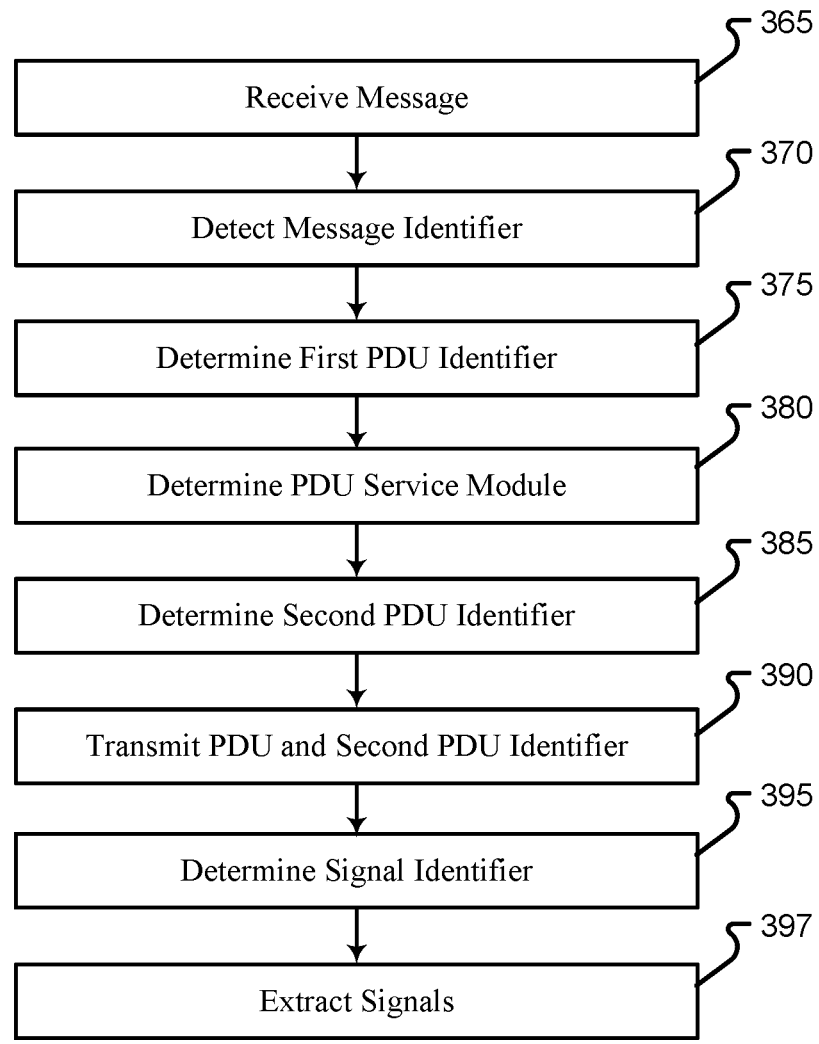

FIG. 3B illustrates an example of a process flow 301 that supports context-based PDU identifier provisioning in accordance with aspects of the present disclosure. In some examples, process flow 301 may implement aspects of the vehicle 100, the network communications system 101, the system 200, and the process flow 300 described with reference to FIG. 1, FIGS. 2A through 2C, and FIG. 3A.

In the following description of the process flow 301, the operations may be performed in a different order than the order shown, or the operations may be performed in different orders or at different times. Certain operations may also be left out of the process flow 301, or other operations may be added to the process flow 301.

It is to be understood that while various modules (e.g., PDU router 204, a PDU manager 212, CAN TP module 250, CAN IF module 254, etc.) of a layered communication architecture of the system 200 are described as performing a number of the operations of process flow 300, any device (e.g., a vehicle 100, a vehicle computing device 604, a computer system 700) or module (e.g., any PDU router, PDU service module, transport module, interface module, etc.) may perform the operations shown. The process flow 301 is described with reference to 'Example C' and 'Example D' of FIG. 2C, but is not limited thereto.

At 365, a device driver (e.g., CAN DRV 258) associated with a communication bus (e.g., a CAN bus, in 'Example C') may receive a message over the communication bus. In some aspects, the message may include a PDU.

At 370, a controller module (e.g., CAN controller 0x01, in 'Example C') may detect a message identifier (e.g., 'MsgId' (0x304) included in the message.

At 375, an interface module (e.g., CAN IF module 254) associated with the communication bus may determine, based the message identifier and using a LUT (e.g., LUT 240-*d* ('CAN Controller 0x01 RX LUT')) associated with the controller module, a first PDU identifier (e.g., 'CanIfId' (0x2304), in 'Example C') associated with the interface module.

At 380, a router module (e.g., PDU router 204) included in a first layer (e.g., communication layer, service layer) of the layered communication architecture may determine, based on the first PDU identifier and using a LUT (e.g., LUT 230-*b* ('CAN IF RX LUT'), in 'Example C') associated with the interface module, a PDU service module (e.g., PDU manager 212, in 'Example C') included in the first layer of the layered communication architecture.

At 385, the router module may determine, based on the first PDU identifier and using a second LUT (e.g., LUT 230-*c* ('CAN RX PDUM ID LUT'), in 'Example C') associated with the interface module, a second PDU identifier (e.g., 'PdumId' (0x6000)) associated with the PDU service module.

At 390, the router module may transmit the PDU and the second PDU identifier to the PDU service module.

At 395, the PDU service module may determine, based on the second PDU identifier and using a LUT (e.g., LUT 220-*c* ('PDUM RX LUT') and/or LUT 220-*d* ('SignalCollectId LUT'), in 'Example C') associated with servicing (e.g., managing) the PDU, a signal identifier (e.g., 'SignalCollectID' (0x1F), in 'Example C') associated with a set of signals (e.g., Signal A through Signal C, in 'Example C') to extract from the PDU.

At 397, the PDU service module may extract, based on the signal identifier and using the LUT associated with servicing (e.g., managing) the PDU, the set of signals.

Figure 4:
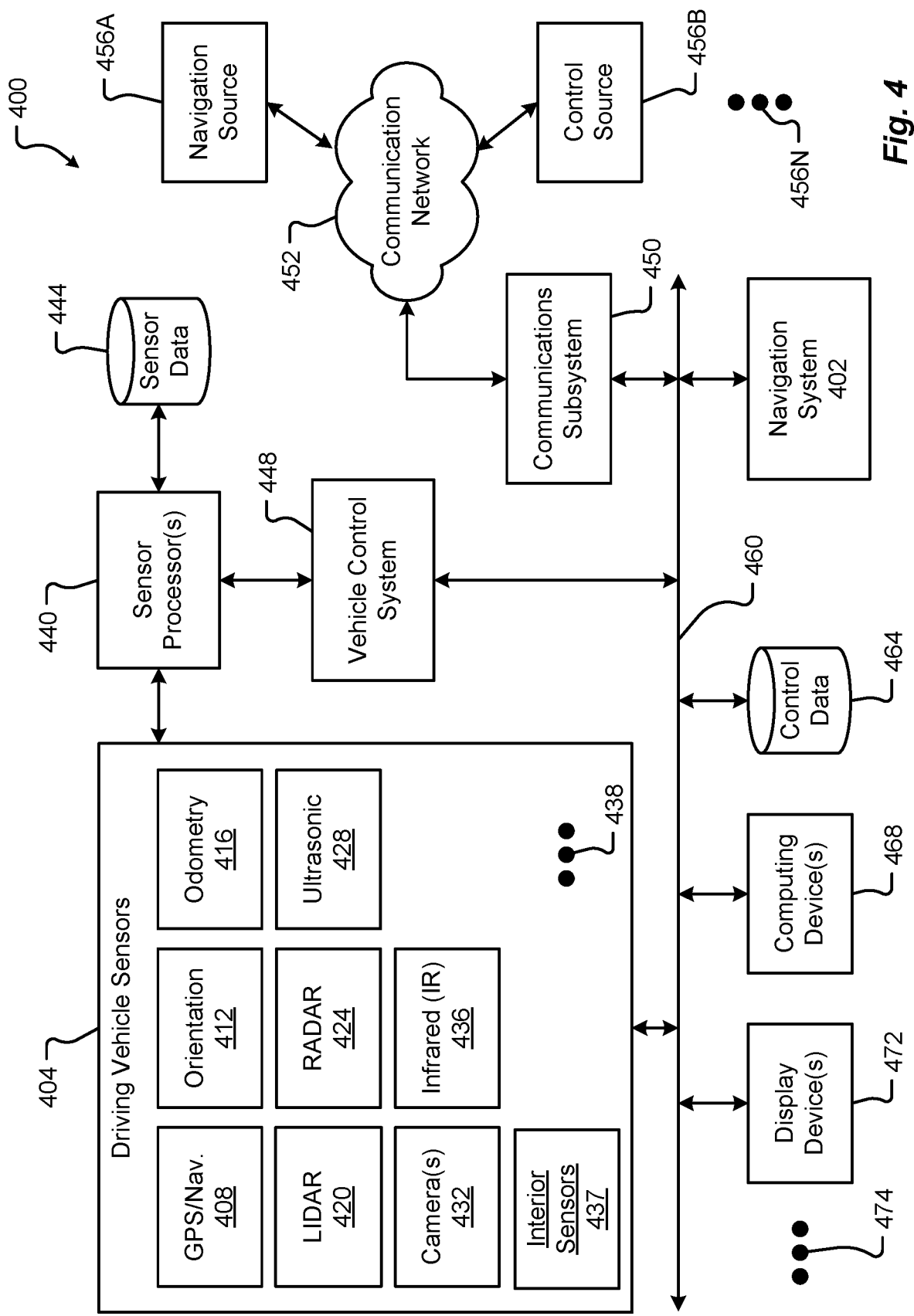
FIG. 4 is a block diagram illustrating an example of a communication environment of the vehicle in accordance with aspects of the present disclosure.

FIG. 4 is a block diagram illustrating an example of a communication environment of the vehicle 100 in accordance with aspects of the present disclosure.

The communication system 400 may include one or more vehicle driving vehicle sensors and systems 404, sensor processors 430, sensor data memory 434, vehicle control system 438, communications subsystem 450, control data 464, computing devices 468, display devices 472, and other components 474 that may be associated with a vehicle 100. These associated components may be electrically and/or communicatively coupled to one another via at least one bus 460. In some embodiments, the one or more associated components may send and/or receive signals across a communication network 452 to at least one of a navigation source 456A, a control source 456B, or some other entity 456N.

In accordance with at least some embodiments of the present disclosure, the communication network 452 may comprise any type of known communication medium or collection of communication media and may use any type of protocols, such as SIP, TCP/IP, SNA, IPX, AppleTalk, and the like, to transport messages between endpoints. The communication network 452 may include wired and/or wireless communication technologies. The Internet is an example of the communication network 452 that constitutes an Internet Protocol (IP) network consisting of many computers, computing networks, and other communication devices located all over the world, which are connected through many telephone systems and other means. Other examples of the communication network 452 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 452 need not be limited to any one network type, and instead may be comprised of a number of different networks and/or network types. The communication network 452 may comprise a number of different communication media such as coaxial cable, copper cable/wire, fiber-optic cable, antennas for transmitting/receiving wireless messages, and combinations thereof.

The driving vehicle sensors and systems 404 may include at least one navigation 408 (e.g., global positioning system (GPS), etc.), orientation 412, odometry 416, LIDAR 420, RADAR 424, ultrasonic 428, camera 432, infrared (IR) 436, and/or other sensor or system 438. These driving vehicle sensors and systems 404 may be similar, if not identical, to the sensors and systems 116A-K, 112 described in conjunction with FIGS. 1 and 2.

The navigation sensor 408 may include one or more sensors having receivers and antennas that are configured to utilize a satellite-based navigation system including a network of navigation satellites capable of providing geolocation and time information to at least one component of the vehicle 100. Examples of the navigation sensor 408 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 412 may include one or more sensors configured to determine an orientation of the vehicle 100 relative to at least one reference point. In some embodiments, the orientation sensor 412 may include at least one pressure transducer, stress/strain gauge, accelerometer, gyroscope, and/or geomagnetic sensor. Examples of the navigation sensor 408 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV494D-A1B6 4D magnetic sensors, Infineon TLI494D-W1B6 4D magnetic sensors, Infineon TL family of 4D magnetic sensors, Murata Electronics SCC2000 series combined gyro sensor and accelerometer, Murata Electronics SCC1400 series combined gyro sensor and accelerometer, other industry-equivalent orientation sensors and/or systems, which may perform orientation detection and/or determination functions using any known or future-developed standard and/or architecture.

The odometry sensor and/or system 416 may include one or more components that is configured to determine a change in position of the vehicle 100 over time. In some embodiments, the odometry system 416 may utilize data from one or more other sensors and/or systems 404 in determining a position (e.g., distance, location, etc.) of the vehicle 100 relative to a previously measured position for the vehicle 100. Additionally or alternatively, the odometry sensors 416 may include one or more encoders, Hall speed sensors, and/or other measurement sensors/devices configured to measure a wheel speed, rotation, and/or number of revolutions made over time. Examples of the odometry sensor/system 416 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 40M compact incremental encoders with advanced magnetic sensing and signal processing technology, EPC Model 925 absolute shaft encoders, EPC Model 958 absolute shaft encoders, EPC Model MA46S/MA64S/SA46S absolute shaft encoders, Dynapar™ F18 commutating optical encoder, Dynapar™ HS45R family of phased array encoder sensors, other industry-equivalent odometry sensors and/or systems, and may perform change in position detection and/or determination functions using any known or future-developed standard and/or architecture.

The LIDAR sensor/system 420 may include one or more components configured to measure distances to targets using laser illumination. In some embodiments, the LIDAR sensor/system 420 may provide 4D imaging data of an environment around the vehicle 100. The imaging data may be processed to generate a full 460-degree view of the environment around the vehicle 100. The LIDAR sensor/system 420 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 420 into a measurement environment. The rotating reflective surface may be configured to continually rotate 460 degrees about an axis, such that the plurality of laser beams is directed in a full 460-degree range around the vehicle 100. A photodiode receiver of the LIDAR sensor/system 420 may detect when light from the plurality of laser beams emitted into the measurement environment returns (e.g., reflected echo) to the LIDAR sensor/system 420. The LIDAR sensor/system 420 may calculate, based on a time associated with the emission of light to the detected return of light, a distance from the vehicle 100 to the illuminated target. In some embodiments, the LIDAR sensor/system 420 may generate over 2.0 million points per second and have an effective operational range of at least 100 meters. Examples of the LIDAR sensor/system 420 as described herein may include, but are not limited to, at least one of Velodyne® LiDAR™ HDL-64E 64-channel LIDAR sensors, Velodyne® LiDAR™ HDL-42E 42-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v4 measurement sensor, Quanergy M8 LiDAR sensors, Quanergy S4 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 424 may include one or more radio components that are configured to detect objects/targets in an environment of the vehicle 100. In some embodiments, the RADAR sensors 424 may determine a distance, position, and/or movement vector (e.g., angle, speed, etc.) associated with a target over time. The RADAR sensors 424 may include a transmitter configured to generate and emit electromagnetic waves (e.g., radio, microwaves, etc.) and a receiver configured to detect returned electromagnetic waves. In some embodiments, the RADAR sensors 424 may include at least one processor configured to interpret the returned electromagnetic waves and determine locational properties of targets. Examples of the RADAR sensors 424 as described herein may include, but are not limited to, at least one of Infineon RASIC™ RTN7745PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 4D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 428 may include one or more components that are configured to detect objects/targets in an environment of the vehicle 100. In some embodiments, the ultrasonic sensors 428 may determine a distance, position, and/or movement vector (e.g., angle, speed, etc.) associated with a target over time. The ultrasonic sensors 428 may include an ultrasonic transmitter and receiver, or transceiver, configured to generate and emit ultrasound waves and interpret returned echoes of those waves. In some embodiments, the ultrasonic sensors 428 may include at least one processor configured to interpret the returned ultrasonic waves and determine locational properties of targets. Examples of the ultrasonic sensors 428 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 432 may include one or more components configured to detect image information associated with an environment of the vehicle 100. In some embodiments, the camera sensors 432 may include a lens, filter, image sensor, and/or a digital image processer. It is an aspect of the present disclosure that multiple camera sensors 432 may be used together to generate stereo images providing depth measurements. Examples of the camera sensors 432 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 436 may include one or more components configured to detect image information associated with an environment of the vehicle 100. The IR sensors 436 may be configured to detect targets in low-light, dark, or poorly-lit environments. The IR sensors 436 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 436 may include at least one processor configured to interpret the returned IR light and determine locational properties of targets. The IR sensors 436 may be configured to detect and/or measure a temperature associated with a target (e.g., an object, pedestrian, other vehicle, etc.). Examples of IR sensors 436 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 480-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 437. Interior sensors 437 can measure characteristics of the inside environment of the vehicle 100.

A navigation system 402 can include any hardware and/or software used to navigate the vehicle either manually or autonomously. The navigation system 402 may be as described in conjunction with FIG. 4C.

In some embodiments, the driving vehicle sensors and systems 404 may include other sensors 438 and/or combinations of the sensors 406-437 described above. Additionally or alternatively, one or more of the sensors 406-437 described above may include one or more processors configured to process and/or interpret signals detected by the one or more sensors 406-437. In some embodiments, the processing of at least some sensor information provided by the vehicle sensors and systems 404 may be processed by at least one sensor processor 430. Raw and/or processed sensor data may be stored in a sensor data memory 434 storage medium. In some embodiments, the sensor data memory 434 may store instructions used by the sensor processor 430 for processing sensor information provided by the sensors and systems 404. In any event, the sensor data memory 434 may be a disk drive, optical storage device, solid-state storage device such as a random access memory ("RAM") and/or a read-only memory ("ROM"), which can be programmable, flash-updateable, and/or the like.

The vehicle control system 438 may receive processed sensor information from the sensor processor 430 and determine to control an aspect of the vehicle 100. Controlling an aspect of the vehicle 100 may include presenting information via one or more display devices 472 associated with the vehicle, sending commands to one or more computing devices 468 associated with the vehicle, and/or controlling a driving operation of the vehicle. In some embodiments, the vehicle control system 438 may correspond to one or more computing systems that control driving operations of the vehicle 100 in accordance with the Levels of driving autonomy described above. In one embodiment, the vehicle control system 438 may operate a speed of the vehicle 100 by controlling an output signal to the accelerator and/or braking system of the vehicle. In this example, the vehicle control system 438 may receive sensor data describing an environment surrounding the vehicle 100 and, based on the sensor data received, determine to adjust the acceleration, power output, and/or braking of the vehicle 100. The vehicle control system 438 may additionally control steering and/or other driving functions of the vehicle 100.

The vehicle control system 438 may communicate, in real-time, with the driving sensors and systems 404 forming a feedback loop. In particular, upon receiving sensor information describing a condition of targets in the environment surrounding the vehicle 100, the vehicle control system 438 may autonomously make changes to a driving operation of the vehicle 100. The vehicle control system 438 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 404, vehicle control system 438, display devices 472, etc.) may communicate across the communication network 452 to one or more entities 456A-N via a communications subsystem 450 of the vehicle 100. Embodiments of the communications subsystem 450 are described in greater detail in conjunction with FIG. 5. For instance, the navigation sensors 408 may receive global positioning, location, and/or navigational information from a navigation source 456A. In some embodiments, the navigation source 456A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 438 may receive control information from one or more control sources 456B. The control source 456 may provide vehicle control information including autonomous driving control commands, vehicle operation override control commands, and the like. The control source 456 may correspond to an autonomous vehicle control system, a traffic control system, an administrative control entity, and/or some other controlling server. It is an aspect of the present disclosure that the vehicle control system 438 and/or other components of the vehicle 100 may exchange communications with the control source 456 across the communication network 452 and via the communications subsystem 450.

Information associated with controlling driving operations of the vehicle 100 may be stored in a control data memory 464 storage medium. The control data memory 464 may store instructions used by the vehicle control system 438 for controlling driving operations of the vehicle 100, historical control information, autonomous driving control rules, and the like. In some embodiments, the control data memory 464 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 5:
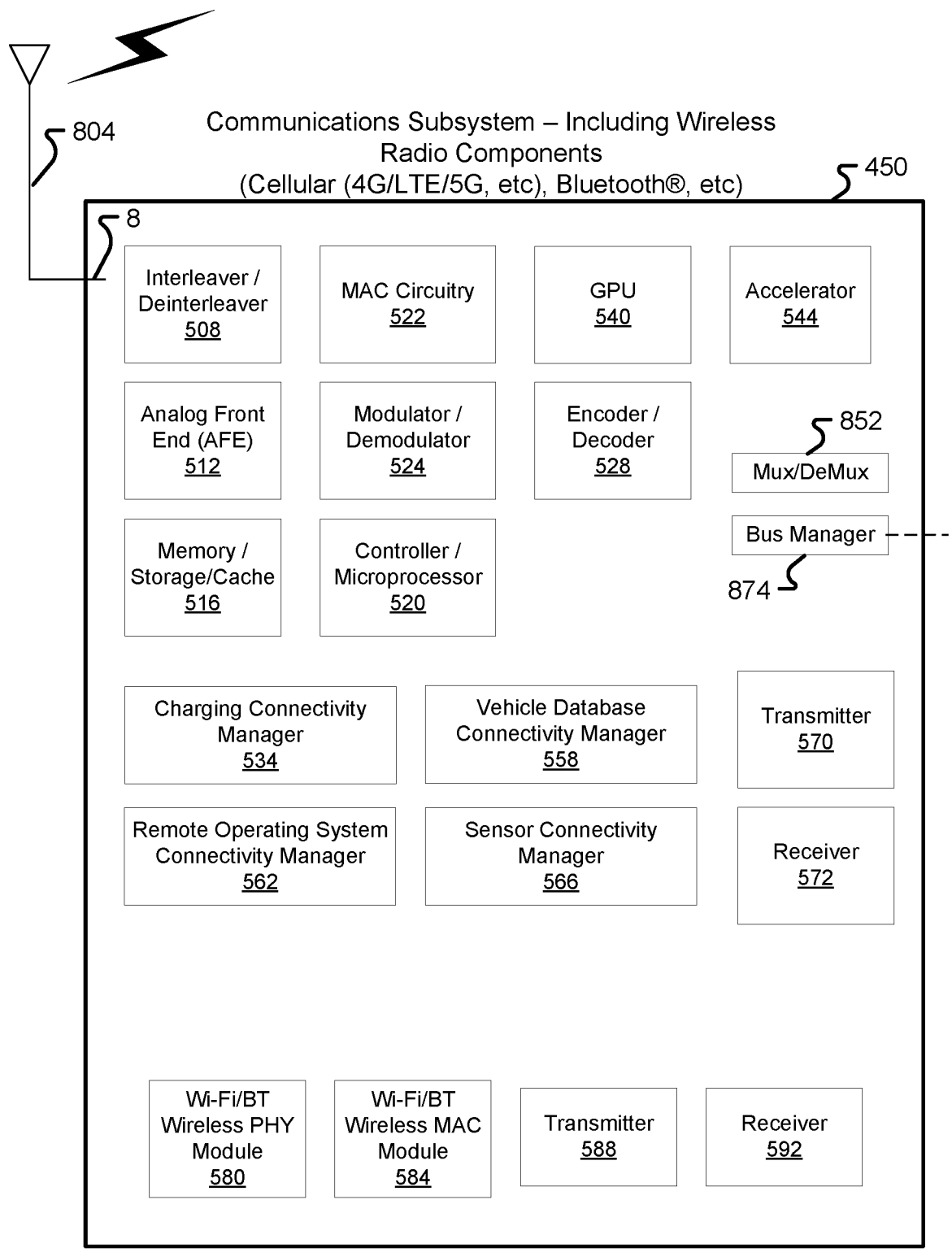
FIG. 5 is a block diagram illustrating an example of a communications subsystem of the vehicle in accordance with aspects of the present disclosure.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 450 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 450 can include one or more communications links (that can be wired or wireless) and/or communications busses (managed by the bus manager 574), including one or more of CAN bus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 450 enables communications between any of the inter-vehicle systems and subsystems as well as communications with non-collocated resources, such as those reachable over a network such as the Internet.

The communications subsystem 450, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 450 are connected by one or more links/busses 5 (not shown, again for sake of clarity).

The device 450 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 450 can also include a controller/microprocessor 520 and a memory/storage/cache 516. The subsystem 450 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 450. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 450 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 450 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 450 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 450 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 450 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
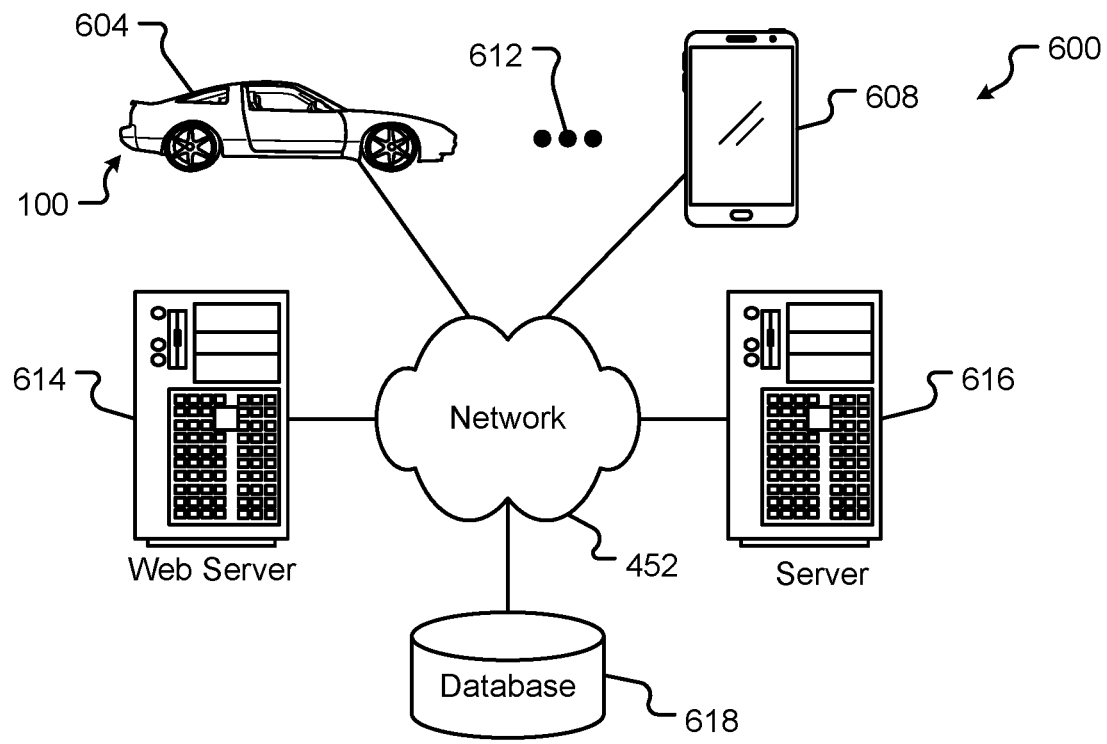
FIG. 6 is a block diagram illustrating an example of a computing environment of the vehicle in accordance with aspects of the present disclosure.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 452 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 452) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
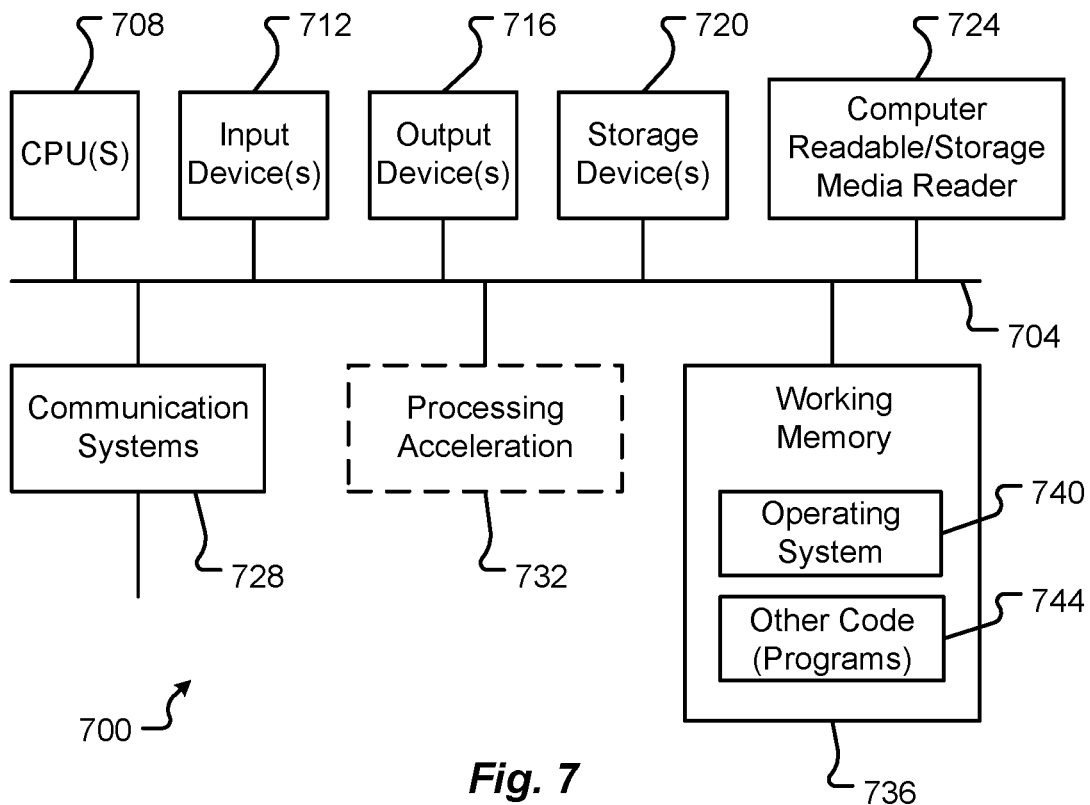
FIG. 7 is a block diagram illustrates an example of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8450 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to a PDU router 104 and a network communications system 101. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Example aspects of the present disclosure include an apparatus including: a layered communication architecture; a processor; and memory in electronic communication with the processor; and instructions stored in the memory, the instructions being executable by the processor to: at a router module included in a first layer of the layered communication architecture, determine, based on a first PDU identifier and using a LUT associated with routing a PDU, a communication bus and an interface module associated with the communication bus; determine, based on the first PDU identifier and using a LUT associated with the interface module, a second PDU identifier associated with the interface module; and transmit the PDU and the second PDU identifier to the interface module.

Aspects of the above apparatus include: where the instructions are further executable by the processor to: at a PDU service module included in the first layer of the layered communication architecture, determine, based on the first PDU identifier and using a LUT associated with servicing the PDU, a signal identifier associated with a set of signals to include in a PDU; generate, based on the LUT associated with servicing the PDU, the PDU including the set of signals; and transmit the PDU and the first PDU identifier to the router module.

Aspects of the above apparatus include: where the instructions are further executable by the processor to: at the PDU service module, identify an event associated with transmitting the PDU; and identify the first PDU identifier, where the first PDU identifier is associated with the event.

Aspects of the above apparatus include: where generating the PDU is based on the first PDU identifier and a second LUT associated with generating the PDU, and where the second LUT includes the set of signals.

Aspects of the above apparatus include: where transmitting the PDU and the first PDU identifier to the router module is associated with a first temporal instance; and transmitting the PDU and the second PDU identifier to the interface module is associated with a second temporal instance.

Aspects of the above apparatus include: where transmitting the PDU and the second PDU identifier to the interface module may include: transmitting the PDU and the second PDU identifier to a transport module associated with the communication bus, where the transport module forwards the PDU and the second PDU identifier to the interface module based on the second PDU identifier.

Aspects of the above apparatus include: where the instructions are further executable by the processor to: determine, at the interface module, based on the second PDU identifier and using a LUT associated with the interface module, a controller identifier indicating a controller module associated with the communication bus; determine, at the interface module, based the second PDU identifier and using a LUT associated with the controller module, a message identifier; and generate, using the controller module, a message including the message identifier and the set of signals.

Aspects of the above apparatus include: where the instructions are further executable by the processor to: transmit the message across the communication bus, using a device driver associated with the communication bus.

Aspects of the above apparatus include: where the instructions are further executable by the processor to: at the router module, determine, based on a third PDU identifier and using the LUT associated with routing the PDU, a second communication bus and a second interface module associated with the second communication bus; determine, based on the third PDU identifier and using a LUT associated with the second interface module, a fourth PDU identifier associated with the second interface module; and transmit the PDU and the fourth PDU identifier to the second interface module.

Aspects of the above apparatus include: where transmitting the PDU and the second PDU identifier to the interface module and transmitting the PDU and the fourth PDU identifier to the second interface module are based on a same data request by the router module.

Aspects of the above apparatus include: a database including a set of LUTs, where each LUT of the set of LUTs is associated with a respective layer of a set of layers of the layered communication architecture, a respective module of a set of modules of the layered communication architecture, or both, where the set of layers may include at least the first layer, and the set of modules may include at least the router module and the interface module.

Aspects of the above apparatus include: where at least one LUT of the set of LUTs may include a non-colliding O(1) lookup table.

Aspects of the above apparatus include: where the database may include multiple sets of PDU identifiers; and each set of PDU identifiers is associated with a respective LUT of the set of LUTs, a respective layer of the layered communication architecture, a respective module of the layered communication architecture, or a combination thereof.

Aspects of the above apparatus include: database including a set of LUTs, where the set of LUTs may include at least one of: a LUT associated with servicing the PDU; the LUT associated with routing the PDU; a LUT associated with the interface module; and a LUT associated with a controller module associated with the communication bus.

Aspects of the above apparatus include: a database including multiple sets of PDU identifiers, where the multiple sets of PDU identifiers may include at least one of: a first set of PDU identifiers associated with multiplexing signals into an outgoing PDU, demultiplexing signals of an incoming PDU, or both; a second set of PDU identifiers associated with routing the outgoing PDU, the incoming PDU, or both; a third set of PDU identifiers associated with determining a transmission interface to which to transmit the outgoing PDU, determining a buffer to which to route the incoming PDU, or both; and a fourth set of PDU identifiers associated with determining a message identifier corresponding to the outgoing PDU, the incoming PDU, or both, where the fourth set of PDU identifiers is associated with determining a communication bus corresponding to the outgoing PDU, the incoming PDU, or both.

Example aspects of the present disclosure include a method including: determining, based on a first PDU identifier and using a LUT associated with routing a PDU, a communication bus and an interface module associated with the communication bus; determining, based on the first PDU identifier and using a LUT associated with the interface module, a second PDU identifier associated with the interface module; and transmitting the PDU and the second PDU identifier to the interface module.

Aspects of the above method include: determining, based on the first PDU identifier and using a LUT associated with servicing the PDU, a signal identifier associated with a set of signals to include in a PDU; generating, based on the LUT associated with servicing the PDU, the PDU including the set of signals; and transmitting the PDU and the first PDU identifier.

Aspects of the above method include: determining, based the second PDU identifier and using a LUT associated with the interface module, a controller identifier indicating a controller module associated with the communication bus; determining, based the second PDU identifier and using a LUT associated with the controller module, a message identifier; and generating, a message including the message identifier and the set of signals.

Example aspects of the present disclosure include an apparatus including: a layered communication architecture; a processor; and memory in electronic communication with the processor; and instructions stored in the memory, the instructions being executable by the processor to: receive a message over a communication bus, using a device driver associated with the communication bus, where the message may include a PDU; detect, using a controller module, a message identifier included in the message; and determine, at an interface module associated with the communication bus, based the message identifier and using a LUT associated with the controller module, a first PDU identifier associated with the interface module.

Aspects of the above apparatus include: where the instructions are further executable by the processor to: at a router module included in a first layer of the layered communication architecture, determine, based on the first PDU identifier and using a LUT associated with the interface module, a PDU service module included in the first layer of the layered communication architecture; determine, based on the first PDU identifier and using a second LUT associated with the interface module, a second PDU identifier associated with the PDU service module; and transmit the PDU and the second PDU identifier to the PDU service module.

Aspects of the above apparatus include: where the instructions are further executable by the processor to: at the PDU service module, determine, based on the second PDU identifier and using a LUT associated with servicing the PDU, a signal identifier associated with a set of signals to extract from the PDU; and extract, based on the signal identifier and using the LUT associated with servicing the PDU, the set of signals.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. An apparatus comprising:
   a processor;
   memory in electronic communication with the processor; and
   instructions stored in the memory, the instructions being executable by the processor to implement a router module in a first layer of a layered communication architecture and that cause the processor to:
      receive, from a source module in the layered communication architecture, a protocol data unit (PDU) and a first PDU identifier assigned to the PDU;
      determine, based at least in part on the first PDU identifier and using a first lookup table (LUT) associated with routing the PDU, a destination module for the PDU and a communication bus over which the PDU is transmitted to the destination module;
      determine, based at least in part on the first PDU identifier and using a second LUT associated with the destination module, a second PDU identifier for the PDU that is recognizable by the destination module, wherein the first PDU identifier is unique to the source module, and wherein the second PDU identifier is unique to the destination module; and
      transmit the PDU and the second PDU identifier to the destination module.

2. The apparatus of claim 1, wherein the instructions are further executable by the processor to:
   at the source module included in the first layer of the layered communication architecture,
      determine, based at least in part on the first PDU identifier and using a third LUT associated with servicing the PDU, a signal identifier associated with a set of signals to include in the PDU;
      generate, based at least in part on the third LUT associated with servicing the PDU, the PDU including the set of signals; and
      transmit the PDU and the first PDU identifier to the router module.

3. The apparatus of claim 2, wherein the instructions are further executable by the processor to:
   at the source module,
      identify an event associated with transmitting the PDU; and
      identify the first PDU identifier, wherein the first PDU identifier is associated with the event.

4. The apparatus of claim 2, wherein:
   generating the PDU is based at least in part on the first PDU identifier and a fourth LUT associated with generating the PDU; and
   the fourth LUT includes the set of signals.

5. The apparatus of claim 2, wherein:
   transmitting the PDU and the first PDU identifier to the router module is associated with a first temporal instance; and
   transmitting the PDU and the second PDU identifier to the destination module is associated with a second temporal instance.

6. The apparatus of claim 1, wherein transmitting the PDU and the second PDU identifier to the destination module comprises:
   transmitting the PDU and the second PDU identifier to a transport module associated with the communication bus,
   wherein the transport module forwards the PDU and the second PDU identifier to the destination module based at least in part on the second PDU identifier.

7. The apparatus of claim 1, wherein the instructions are further executable by the processor to:
   determine, at the destination module, based at least in part on the second PDU identifier and using the second LUT associated with the destination module, a controller identifier indicating a controller module associated with the communication bus;
   determine, at the destination module, based at least in part the second PDU identifier and using a third LUT associated with the controller module, a message identifier; and
   generate, using the controller module, a message comprising the message identifier and a set of signals.

8. The apparatus of claim 7, wherein the instructions are further executable by the processor to:
   transmit the message across the communication bus using a device driver associated with the communication bus.

9. The apparatus of claim 1, wherein the instructions are further executable by the processor to:
   at the router module,
      determine, based at least in part on a third PDU identifier and using the first LUT associated with routing the PDU, a second destination module for the PDU and a second communication bus over which the PDU is transmitted to the second destination module;
      determine, based at least in part on the third PDU identifier and using a third LUT associated with the second destination module, a fourth PDU identifier for the PDU and the second destination module; and
      transmit the PDU and the fourth PDU identifier to the second destination module.

10. The apparatus of claim 9, wherein transmitting the PDU and the second PDU identifier to the destination module and transmitting the PDU and the fourth PDU identifier to the second destination module are based at least in part on a same data request by the router module.

11. The apparatus of claim 1, further comprising:
   a database comprising a set of LUTs, wherein each LUT of the set of LUTs is associated with a respective layer of a set of layers of the layered communication architecture, a respective module of a set of modules of the layered communication architecture, or both, wherein:
the set of layers comprise at least the first layer, and
the set of modules comprise at least the router module and the destination module.

12. The apparatus of claim 11, wherein at least one LUT of the set of LUTs comprises a non-colliding O(1) lookup table.

13. The apparatus of claim 11, wherein:
the database comprises multiple sets of PDU identifiers; and
each set of PDU identifiers is associated with a respective LUT of the set of LUTs, a respective layer of the layered communication architecture, a respective module of the layered communication architecture, or a combination thereof.

14. The apparatus of claim 1, further comprising a database comprising a set of LUTs, wherein the set of LUTs comprises at least one of:
the first LUT associated with routing the PDU;
the second LUT associated with the destination module;
a third LUT associated with servicing the PDU; and
a fourth LUT associated with a controller module of a type associated with the communication bus.

15. The apparatus of claim 1, further comprising a database comprising multiple sets of PDU identifiers, wherein the multiple sets of PDU identifiers comprise at least one of:
a first set of PDU identifiers associated with multiplexing signals into an outgoing PDU, demultiplexing signals of an incoming PDU, or both;
a second set of PDU identifiers associated with routing the outgoing PDU, the incoming PDU, or both;
a third set of PDU identifiers associated with determining a transmission interface to which to transmit the outgoing PDU, determining a buffer to which to route the incoming PDU, or both; and
a fourth set of PDU identifiers associated with determining a message identifier corresponding to the outgoing PDU, the incoming PDU, or both,
wherein the fourth set of PDU identifiers is associated with determining a communication bus corresponding to the outgoing PDU, the incoming PDU, or both.

16. A method comprising:
receiving, from a source module in a layered communication architecture, a protocol data unit (PDU) and a first PDU identifier assigned to the PDU;
determining, based at least in part on the first PDU identifier and using a first lookup table (LUT) associated with routing the PDU, a destination module for the PDU and a communication bus over which the PDU is transmitted to the destination module;
determining, based at least in part on the first PDU identifier and using a second LUT associated with the destination module, a second PDU identifier for the PDU that is recognizable by the destination module, wherein the first PDU identifier is unique to the source module, and wherein the second PDU identifier is unique to the destination module; and
transmitting the PDU and the second PDU identifier to the destination module.

17. The method of claim 16, further comprising:
determining, based at least in part on the first PDU identifier and using a third LUT associated with servicing the PDU, a signal identifier associated with a set of signals to include in a PDU;
generating, based at least in part on the third LUT associated with servicing the PDU, the PDU including the set of signals; and
transmitting the PDU and the first PDU identifier.

18. The method of claim 16, further comprising:
determining, based at least in part the second PDU identifier and using the second LUT associated with the destination module, a controller identifier indicating a controller module associated with the communication bus;
determining, based at least in part the second PDU identifier and using a third LUT associated with the controller module, a message identifier; and
generating, a message comprising the message identifier and a set of signals.

19. An apparatus comprising:
a processor;
memory in electronic communication with the processor; and
instructions stored in the memory, the instructions being executable by the processor to:
receive a message over a communication busy using a device driver associated with the communication bus, wherein the message comprises a protocol data unit (PDU);
detect, using a controller module associated with the communication bus, a message identifier included in the message;
determine, at an interface module of a same type as the communication bus, based at least in part on receiving the message identifier from the controller module and using a lookup table (LUT) of a same type as the controller module, a first PDU identifier for the PDU that is unique to the interface module; and
transmit, by the interface module, the PDU and the first PDU identifier to a router module included in a first layer of a layered communication architecture.

20. The apparatus of claim 19, wherein the instructions are further executable by the processor to:
at the router module included in the first layer of the layered communication architecture,
determine, based at least in part on the first PDU identifier and using a second LUT associated with the interface module, a PDU service module included in the first layer of the layered communication architecture;
determine, based at least in part on the first PDU identifier and using a third LUT associated with the interface module, a second PDU identifier for the PDU that is recognizable by the PDU service module; and
transmit the PDU and the second PDU identifier to the PDU service module.

21. The apparatus of claim 20, wherein the instructions are further executable by the processor to:
at the PDU service module,
determine, based at least in part on the second PDU identifier and using a fourth LUT associated with servicing the PDU, a signal identifier associated with a set of signals to extract from the PDU; and
extract, based at least in part on the signal identifier and using the fourth LUT associated with servicing the PDU, the set of signals.

* * * * *